US007292559B2

(12) United States Patent
Yoshino et al.

(10) Patent No.: US 7,292,559 B2
(45) Date of Patent: Nov. 6, 2007

(54) ADVERTISING SYSTEM AND ADVERTISING SIGNS

(75) Inventors: Shuichi Yoshino, Kanagawa-ken (JP); Masashi Shimizu, Kanagawa-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 870 days.

(21) Appl. No.: 10/623,767

(22) Filed: Jul. 21, 2003

(65) Prior Publication Data

US 2004/0141485 A1 Jul. 22, 2004

(30) Foreign Application Priority Data

Jul. 23, 2002 (JP) ............................. 2002-213239
Mar. 24, 2003 (JP) ............................. 2003-079369

(51) Int. Cl.
*H04Q 7/24* (2006.01)

(52) U.S. Cl. ...................................................... 370/338

(58) Field of Classification Search .................. 705/14; 709/206; 455/566, 426.1

See application file for complete search history.

(56) References Cited

U.S. PATENT DOCUMENTS

| | | | | |
|---|---|---|---|---|
| 6,473,629 | B1 * | 10/2002 | Chang | 455/566 |
| 2002/0077896 | A1 * | 6/2002 | Liu et al. | 705/14 |
| 2003/0212745 | A1 * | 11/2003 | Caughey | 709/206 |

FOREIGN PATENT DOCUMENTS

| | | |
|---|---|---|
| FR | 2 811 843 | 1/2002 |
| JP | H11-065494 | 3/1999 |
| JP | H11-098028 | 4/1999 |
| JP | 2001-167197 | 6/2001 |
| JP | 2002-175474 | 6/2002 |
| WO | WO 01/45065 | 6/2001 |

(Continued)

OTHER PUBLICATIONS

Hiroyuki Takagi and Shigeyuki Nakatsuka; "Special Topics—Techniques for Wireless Data Transmission: Understanding Infrared Remote Control"; in Transistor Technology (in Japanese); vol. 33, No. 386; CQ Publishing; Nov. 1996; pp. 261-268 (see "Description of the Related Art" section in the background section of the present application).

(Continued)

*Primary Examiner*—Duc M. Nguyen
*Assistant Examiner*—Wayne Cai
(74) *Attorney, Agent, or Firm*—Harness, Dickey & Pierce, P.L.C.

(57) ABSTRACT

An advertising system and an advertising sign are provided in which the address on the advertising sign can be actively used, the advertising sign can directly serve as a buying and selling device, there is no interference in the advertising sign between the data transmitted simultaneously from a plurality of wireless devices, and the transmission direction of the electromagnetic waves or sound waves transmitted to the advertising sign is clear. The wireless device transmits a terminal address that indicates the address of the terminal to the sign apparatus, the sign apparatus receives the terminal address transmitted from the wireless device and transmits the received terminal address to the advertising server via a public network or the Internet, and the advertising server receives the terminal address transmitted from the sign apparatus and transmits the advertising data to the terminal having the address indicated by the received terminal address.

2 Claims, 15 Drawing Sheets

FOREIGN PATENT DOCUMENTS

| | | |
|---|---|---|
| WO | WO 01/61671 | 8/2001 |
| WO | WO 02/05250 | 1/2002 |

OTHER PUBLICATIONS

"Distribution Management Systems using Bar Code Readers for Mobile Telephones"; Mobile Media Magazine (in Japanese); vol. 79; C. Media Co., Ltd.; Mar. 2002; p. 15 (see "Description of the Related Art" section in the background section of the present application).

European Search Report dated Sep. 30, 2005.

Japanese Office Action dated Feb. 7, 2006 issued on Japanese Patent Application No. 2003-276320.

* cited by examiner

ADVERTISING SYSTEM AND ADVERTISING SIGNS

BACKGROUND OF THE INVENTION

1. Field of the Invention

The present invention relates to an advertising system and advertising signs, and in particular, to an advertising system and advertising signs that transmit and receive data about products and services appearing in the advertising signs that show advertisements using a network.

2. Description of the Related Art

Advertising Signs

Advertising signs are signs showing advertisements about products and services, and they are commonly seen in shopping areas, buildings, and train stations. Users who wish to know more detailed information about these products and services after viewing this advertising sign or users who have decided they would like to receive an offer of these products and services after seeing the advertising sign take, for example, the following actions.

Specifically, one action is going to a store that handles the products or services. Another action is to write down the URL (Uniform Resource Locator) address or the like, input this information into a computer, PDA (Personal Digital—or Data—Assistant, a mobile information terminal), or mobile telephone, and then access a server via the Internet in the case that address such as the URL for the server on a network appears in the advertising sign. This server provides detailed information about the products and services and handles offers of these products and services.

Wireless Devices

Generally, apparatuses that transmit and receive data by using electromagnetic waves (electrical waves or light) or sound waves (including ultrasonic waves) and that use a multiple access format such as FDMA (Frequency Division Multiple Access), TDMA (Time Division Multiple Access), or the like can carry out one-to-many communication. However, because they are expensive, inexpensive apparatuses that do not use multiple access formats such as FDMA, TDMA, or the like are used. One example of such an inexpensive apparatus is a remote control apparatus that uses infrared light (refer, for example, to Hiroyuki Takagi and Shigeyuki Nakatsuka, "Special Topics—Techniques for Wireless Data Transmission: Understanding Infrared Remote Control", in *Transistor Technology* (in Japanese), vol. 33, no. 386, CQ Publishing, November 1996, pp. 261-268).

Therefore, among inexpensive apparatuses such as remote control apparatuses that use infrared light, one-to-one communication over a single channel is assumed.

The reception directionality of the conventional wireless device that assumes one-to-one communication over a single channel is shown in FIG. 21.

As shown in FIG. 21, in the conventional wireless device 200 that assumes one-to-one communication, an infrared light receiving element having an extremely broad directionality is used in the wireless receiving unit 201 in order to allow reception of infrared light or the like transmitted from a remote control apparatus from any direction. Moreover, reference numeral 202 in the figure denotes the directionality pattern of the wireless receiving unit 201.

Advertising Signs

However, going to stores that handle the products and services, writing down the URLs that appear in an advertising sign, and inputting the noted URLs into a computer, PDA, or mobile telephone, is time consuming and laborious.

Therefore, in the conventional advertising sign, there is the problem that address appearing in the advertising sign, for example, the URLs of a server that handles products and services, is not actively used.

Thus, conventionally, there has been the problem that advertising signs do not serve as a direct buying or selling device.

A system that uses a bar code reader and a mobile telephone is a method for solving this problem (refer, for example, to "Distribution Management Systems using Bar Code Readers for Mobile Telephones", *Mobile Media Magazine* (in Japanese), vol. 79, C. Media Co., Ltd., March 2002, p. 15). In this system, a mobile telephone and a bar code reader are connected, and the bar code reader reads the bar code in an advertisement. The values read by the bar code are then used by the mobile telephone. In the case that the bar code in the advertisement represents a URL, it is possible to read the data for the URL into the mobile telephone by reading the bar code, and thereby the user does not have to input the character string of the URL. However, when a bar code reader is used, because the information presented in the advertising sign is in the form of a bar code, it is not intuitively obvious to the user that the bar code represents a URL. Furthermore, in order for the user to read the bar code, it is necessary for the bar code reader to be brought sufficiently close to the advertisement, and thus the range in which the URL can be read into the mobile telephone is limited.

Wireless Devices

In addition, although the conventional wireless device 200 described above has an infrared light receiving element that has an extremely broad directionality, as described above, multiple access formats such as FDMA and TDMA are not used. Therefore, in the conventional wireless device 200 described above, in the case that data is transmitted simultaneously from a plurality of wireless devices, there is the problem of interference between the data signals, and they cannot be received.

In addition, in the conventional remote control apparatus, because invisible infrared light is used, the direction in which the infrared light is being transmitted is unclear. Therefore, in the case that there is a plurality of the conventional wireless devices 200 shown in FIG. 21, there is the problem that a wireless device other than the desired wireless device will receive the infrared light transmitted from the remote control apparatus.

SUMMARY OF THE INVENTION

Thus, in consideration of the problems described above, it is an object of the present invention to provide an advertising system and advertising sign wherein the addresses in an advertising sign can be actively used, the advertising sign serves as a direct buying and selling device, there is no interference between data simultaneously transmitted from a plurality of wireless apparatuses toward the advertising sign, and the transmission direction of electromagnetic waves or sound waves transmitted by the advertising sign is clear.

According to the present invention, the problems described above are solved by the following means.

The first advertising system according to the present invention comprises a wireless device; an advertising sign having one or more sign apparatuses; and an advertising server that transmits advertising data to a terminal; wherein:

the wireless device transmits a terminal address indicating the address of the terminal to a sign apparatus; the sign apparatus receives the terminal address transmitted from the wireless device and transmits the received terminal address to the advertising server via a public network or the Internet; and the advertising server receives the terminal address transmitted from the sign apparatus and transmits the advertising data to the terminal having the address indicated by the received terminal address.

In the first advertising system described above, the wireless device comprises: an external interface that inputs one or more terminal addresses from the terminal; a memory that stores the terminal addresses input into the external interface; an input interface that inputs a selection instruction that commands selecting one terminal address from among the terminal addresses stored in the memory; a central control unit that selects the one terminal address from among the terminal addresses stored in the memory depending on the selection instruction input into the input interface; a wireless transmitting unit that inputs the one terminal address selected by the central control unit from the central control unit and transmits the one input terminal address as electromagnetic waves, including electrical waves and light, or sound waves, including ultrasonic waves; and a marker unit that visually shows the direction of the electromagnetic waves or the sound waves transmitted by the wireless transmitting unit.

In the first advertising system described above, the sign apparatus comprises: one or more wireless receiving units that each have a narrow directionality, and receive the terminal addresses transmitted from the plurality of respective wireless devices as electromagnetic waves, including electrical waves and light, or sound waves, including ultrasonic waves; a memory that stores the terminal addresses received by each of the wireless receiving units; a central control unit that reads one of the terminal addresses stored by the memory; and an external interface that inputs the terminal address read by the central control unit and transmits the input terminal address to the advertising server via the public network or the Internet.

The second advertising system according to the present invention comprises a terminal connected to a wireless device; an advertising sign having one or more sign apparatuses; and an advertising server that transmits advertising data to the terminal; wherein the terminal transmits a transmission request for an advertising server address that indicates the address of the advertising server to one of the sign apparatuses via the wireless device; the sign apparatus receives the transmission request transmitted from the terminal and transmits the advertising server address to the terminal via the wireless device depending on the received transmission request; the advertising server receives the transmission request for advertising data transmitted from the terminal that received the advertising server address and transmits to the terminal the advertising data via a public network or the Internet depending on the received transmission request for advertising data.

In the second advertising system described above, the wireless device comprises: a wireless receiving unit that receives the advertising server address transmitted from the sign apparatus as electromagnetic waves, including electrical waves and light, or sound waves, including ultrasonic waves; an external interface that inputs one or more terminal addresses indicating the address of the terminal from the terminal or outputs the advertising server address to the terminal; a memory that stores the terminal addresses input by the external interface from the terminal or the advertising server address received from the wireless receiving unit; an input interface that inputs a selection instruction that selects one terminal address or advertising server address from among the terminal addresses or the advertising server address stored in the memory; a central control unit that selects one terminal address or advertising server address output to the external interface from among the terminal addresses or the advertising server address stored in the memory depending on the selection instruction input by the input interface; a wireless transmitting unit that inputs the one terminal address selected by the central control unit from the central control unit and transmits the one input terminal address as electromagnetic waves, including electrical waves and light, or sound waves, including ultrasonic waves; and a marker unit that visually shows the direction of the electromagnetic waves or sound waves transmitted by the wireless transmitting unit.

In the second advertising system described above, the sign apparatus comprises: one or more wireless receiving units that each have a narrow directionality and that receive the terminal addresses transmitted from the plurality of wireless devices as electromagnetic waves, including electrical waves and light, or sound waves, including ultrasonic waves; a memory that stores advertising data and the terminal address received by each of the wireless receiving units; a central control unit that reads each of the advertising data and the terminal addresses stored in the memory; and one or more wireless transmitting units that each have a narrow directionality and each transmit the advertising data read by the central control unit to the terminal having the address indicated by the terminal address as electromagnetic waves, including electrical waves and light, or sound waves, including ultrasonic waves.

In the second advertising system described above, the wireless device transmits the terminal address indicating the address of the terminal that transmitted the transmission request along with the transmission request to the sign apparatus; the sign apparatus transmits the terminal address transmitted from the wireless device along with the advertising server address to the wireless device; and the wireless device determines whether or not the advertising server address is addressed to the wireless device itself based on the terminal address that is transmitted from the sign apparatus along with the advertising server address and transmits the advertising server address to the terminal when the advertising server address is addressed to the wireless device itself.

The third advertising system of the present invention comprises: a terminal connected to a wireless device; an advertising sign having one or more sign apparatuses; and an advertising server that transmits advertising data to the terminal; wherein: the sign apparatus transmits an advertising server address that indicates the address of the advertising server to the terminal; the terminal receives the advertising server address transmitted from the sign apparatus via the wireless device and transmits a transmission request for advertising data to the advertising server having the address indicated by the received advertising server address; the advertising server receives the transmission request for the advertising data transmitted from the terminal and transmits the advertising data to the terminal via a public network or the Internet depending on the received transmission request for advertising data.

In the third advertising system described above, the wireless device comprises a wireless receiving unit that receives the advertising server address transmitted from the sign apparatus as electromagnetic waves, including electrical waves and light, or sound waves, including ultrasonic waves; a memory that stores the advertising server address received from the wireless receiving unit; an external interface that outputs the advertising server address to the terminal; a central control unit that outputs the advertising server address stored in the memory to the external interface; and a marker unit that visually shows the direction of the electromagnetic waves or sound waves received by the wireless receiving unit.

In the third advertising system described above, the sign apparatus comprises a memory that stores the advertising server address; a central control unit that reads the advertising server address stored in the memory; and one or more wireless transmitting units that each have a narrow directionality and transmit the advertising server address read by the central control unit as electromagnetic waves, including electrical waves and light, or sound waves, including ultrasonic waves.

In the first though third advertising systems, the terminal can be a mobile telephone, personal computer, or a mobile information terminal.

As explained above, according to the present invention, the advertising signs have a data transmission capacity, a data reception capacity, or both a data reception capacity and a data reception capacity.

Therefore, according to the present invention, by the advertising sign carrying out communication with a user via electromagnetic waves, sound waves, or a public network, the advertiser who produced the advertisement for the products or services and the user can directly or indirectly transmit and receive data about the products and services.

Thus, according to the present invention, the efficiency of the transmission of information between the user who views the advertisement for a product or a service and the advertiser that produced this advertisement is improved.

In addition, according to the present invention, a user who has seen an advertising sign can carry out the buying and selling of the products directly at that location.

In addition, according to the present invention, the user can omit the labor and time consumed inputting the Internet address that handles the products and services into a mobile telephone or PDA, and thereby the address in the advertising sign can be actively used.

In addition, according to the present invention, the sign apparatus can receive data transmitted simultaneously from a plurality of wireless devices without interference therebetween.

In addition, according to the present invention, the transmitting unit and the receiving unit in the sign apparatus are separate, and thereby in the receiving unit handling a small amount of information, it is possible to use a medium having a low electrical drive power, and it is possible to decrease the standby power from the drive power source.

Furthermore, according to the present invention, by using a battery or the like as a drive power source, the drive time can be extended, and thereby it is possible to realize a decrease in maintenance fees.

In addition, according to the present invention, a marker function is used, and thereby it is possible to know the direction and location of the electromagnetic waves or sound waves transmitted by other wireless devices. Thus, according to the present invention, as a result it is possible to avoid simultaneous transmission of electromagnetic waves or sound waves to one sign apparatus by a plurality of wireless devices.

In addition, according to the present invention, the sign apparatus transmits the terminal address transmitted from the wireless device to the wireless device with the advertising server address attached, and thereby the wireless device can transmit to a terminal only the advertising server address requested by the wireless device itself.

PREFERRED EMBODIMENTS OF THE PRESENT INVENTION

Below, the preferred embodiments of the present invention will be explained with reference to the figures.

The Embodiments According to the First Aspect of the Present Invention

First Embodiment According to the First Aspect of the Present Invention

Figure 1:
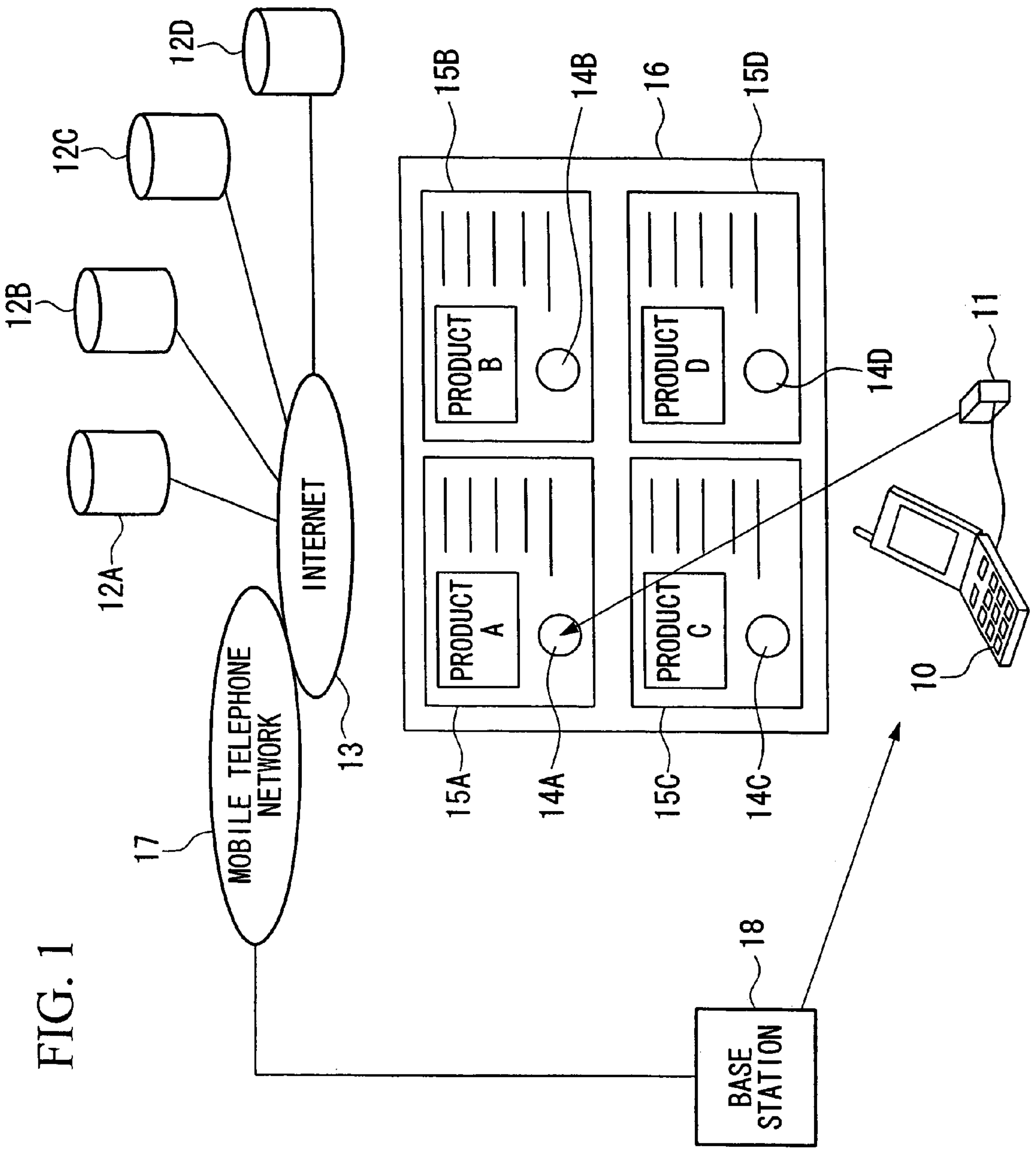
FIG. 1 is a drawing showing the advertising system according to the first embodiment of the first aspect of the present invention.

FIG. 1 is a drawing showing the first embodiment of the advertising system according to the first aspect of the present invention.

As shown in FIG. 1, the first embodiment of the advertising system according to the first aspect of the present invention comprises a mobile telephone 10; a wireless device 11 that is connected to the mobile telephone 10 and stores the electronic mail address of this mobile telephone 10 in an internal memory (not illustrated); product A server 12A, product B server 12B, product C server 12C, and product D server 12D that handle products; and an advertising sign 16 connected to the Internet 13 and having four sign apparatuses 15A to 15D that transmit the addresses (URLs) of the home pages of the respective product A server 12A, product B server 12B, product C server 12C, and product D server 12D to the received electronic mail address when the electronic mail address transmitted from the wireless device 11 is received by the respective wireless receiving units 14A to 14D.

Figure 2:
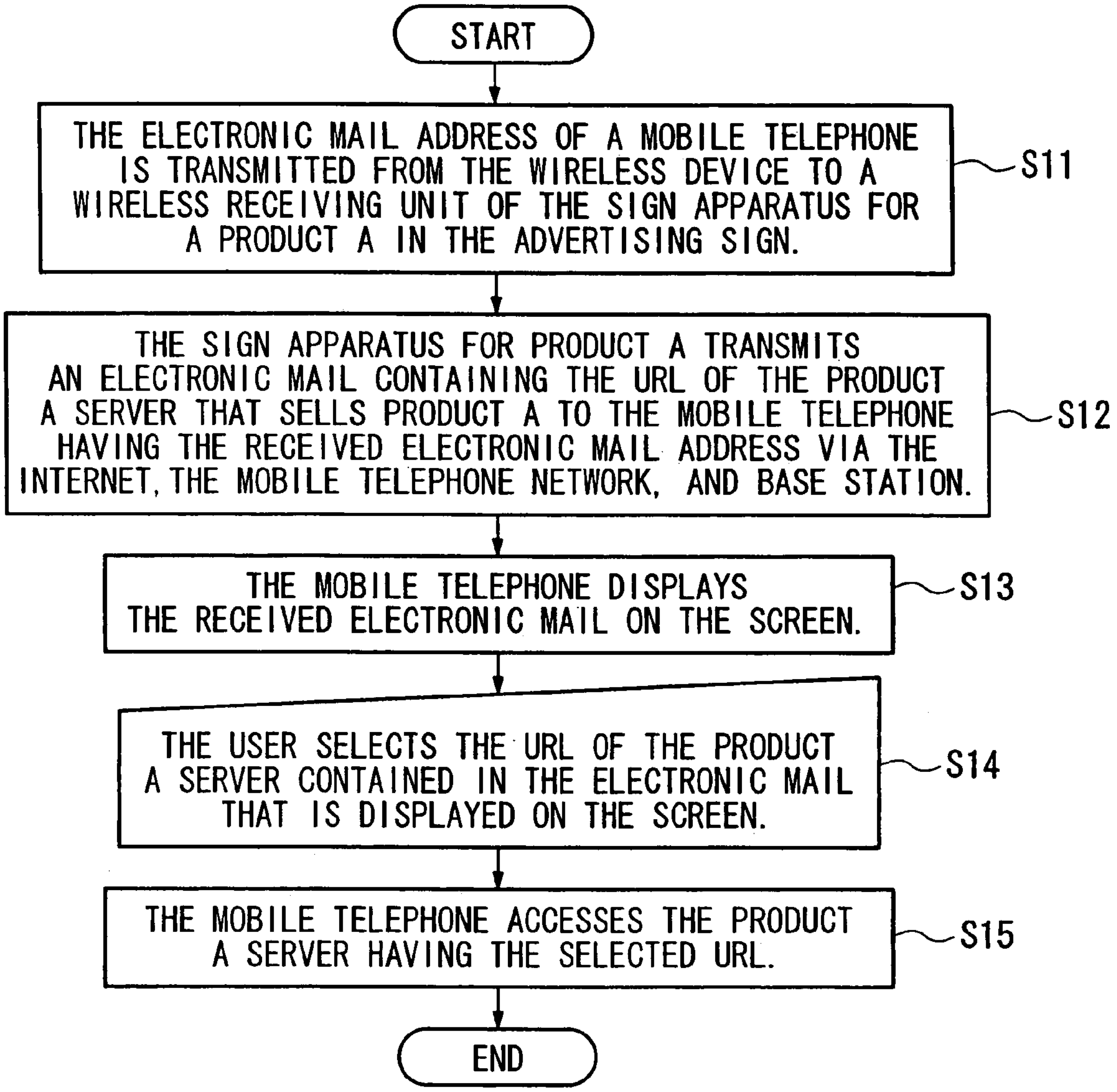
FIG. 2 is a flowchart showing the flow of signals in the advertising system according to the first embodiment of the first aspect of the present invention.

Below, the flow of signals in the first embodiment of the advertising system according to the first aspect of the present invention will be explained with reference to the flowchart in FIG. 2.

In the first embodiment of the advertising system according to the first aspect of the present invention, assume that advertisements related to product A, product. B, product C, and product D appear in the advertising sign 16, a user sees the advertisements about these products, and decides to purchase product A.

The user who has decided to purchase product A transmits the electronic mail address of the mobile telephone 10 from the wireless device 11 to the wireless receiving unit 14A of the sign apparatus ISA for the product A in the advertising sign 16 (step S 11).

The sign apparatus ISA for the product A that has received to electronic mail transmitted from the wireless device 11 transmits an electronic mail containing the URL of the product A server 12, which sells product A, to the mobile telephone 10 having this electronic mail address via the Internet 13, the mobile telephone network 17, and the base station 18 (step S 12).

The mobile telephone 10 that has received the electronic mail transmitted from the sign apparatus 15A for product A displays the received electronic mail on the screen (step S 13).

The user who sees the electronic mail displayed in the screen selects the URL of the product A server 12A contained in this electronic mail (step S 14).

Next, the user accesses the product A server 12A having the selected URL from the mobile telephone 10, and purchases the product A on the Internet 13 (step S 15).

In this manner, the user in the first embodiment of the advertising system according to the first aspect of the present invention immediately accesses the product A server 12A selling this product A on the Internet 13 directly at the location where the advertising sign 16 was seen when the user decides to purchase product A after seeing the advertising sign 16.

Figure 3:
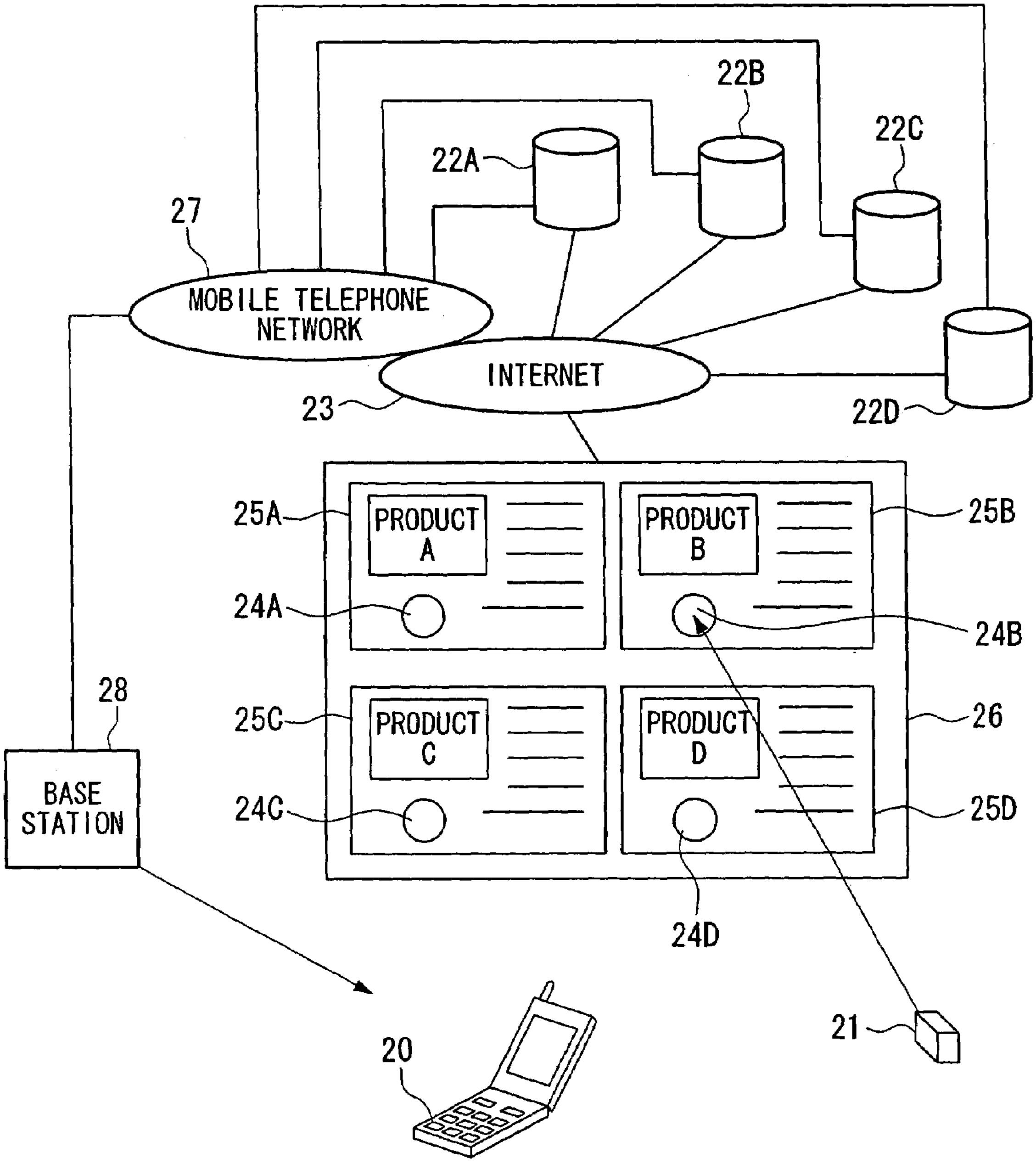
FIG. 3 is a drawing showing the advertising system according to the second embodiment of the first aspect of the present invention.

Second Embodiment of the Advertising System According to the First Aspect of the Present Invention FIG. 3 is a drawing showing the second embodiment of the advertising system according to the first aspect of the present invention.

As shown in FIG. 3, the second embodiment of the advertising system according to the first aspect of the present invention comprises a mobile telephone 20; a wireless device 21 that is connected to this mobile telephone 20 and stores the telephone number of this mobile telephone 20 in an internal memory (not illustrated); product A server 22A, product B server 22B, product C server 22C, and product D server 22D that handle the products; and an advertising sign 26 that is connected to the Internet 23 and has four sign apparatuses 25A to 25D that transmit data requesting a telephone call at this received telephone number from the sales site for the product to the respective product A server 22A, product B server 22B, product C server 22C, and product D server 22D when a telephone number transmitted from the wireless device 21 is received by one of the wireless receiving units 24A to 24D.

Figure 4:
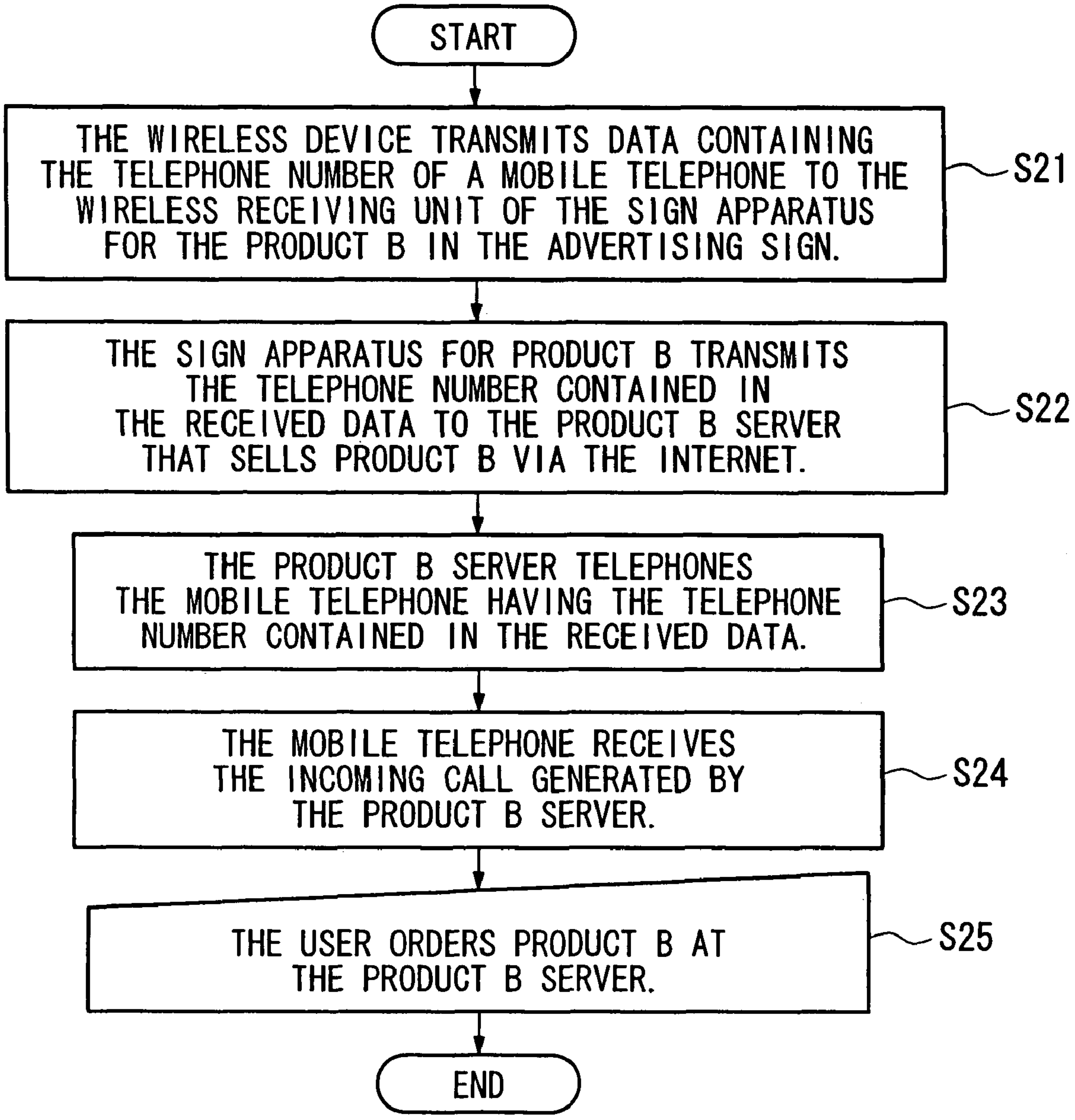
FIG. 4 is a flowchart showing the flow of signals in the advertising system according to the second embodiment of the first aspect of the present invention.

Below, the flow of signals in the second embodiment of the advertising system according to the first aspect of the present invention will be explained with reference to the flowchart in FIG. 4.

In the second embodiment of the advertising system according to the first aspect of the present invention, assume that advertisements for product A, product B, product C, and product D appear in the advertising sign 26, and the user has decided to purchase product B after viewing the advertisements for these products.

The user who has decided to purchase product B transmits data that contains the telephone number of the mobile telephone 20 from the wireless device 21 to the wireless receiving unit 24B of the sign apparatus 25B for product B in the advertising sign 26 (step S 21).

The sign apparatus 25B for product B that has received the telephone number transmitted from wireless device 21 transmits the telephone number contained in the received data to the product B server 22B, which sells product B, via the Internet 23 (step S 22).

The product B server 22B that has received the telephone number transmitted by the sign apparatus 25B for product B telephones the mobile telephone 20 having the telephone number contained in the received data via the mobile telephone network 27 and the base station 28 (step S 23). The mobile telephone 20 that is called by the product B server 22B receives the incoming call generated by the product B server 22B (step S 24).

Next, the user orders product B at the product B server 22B from the mobile telephone 20 (step S 25).

In this manner, when the user has decided to purchase the product B after seeing the advertising sign 26, the user in the second embodiment of the advertising system according to the first aspect of the present invention directly orders product B from the product B server 22B using the mobile telephone 20 from the location where the advertising sign 26 was seen.

Figure 5:
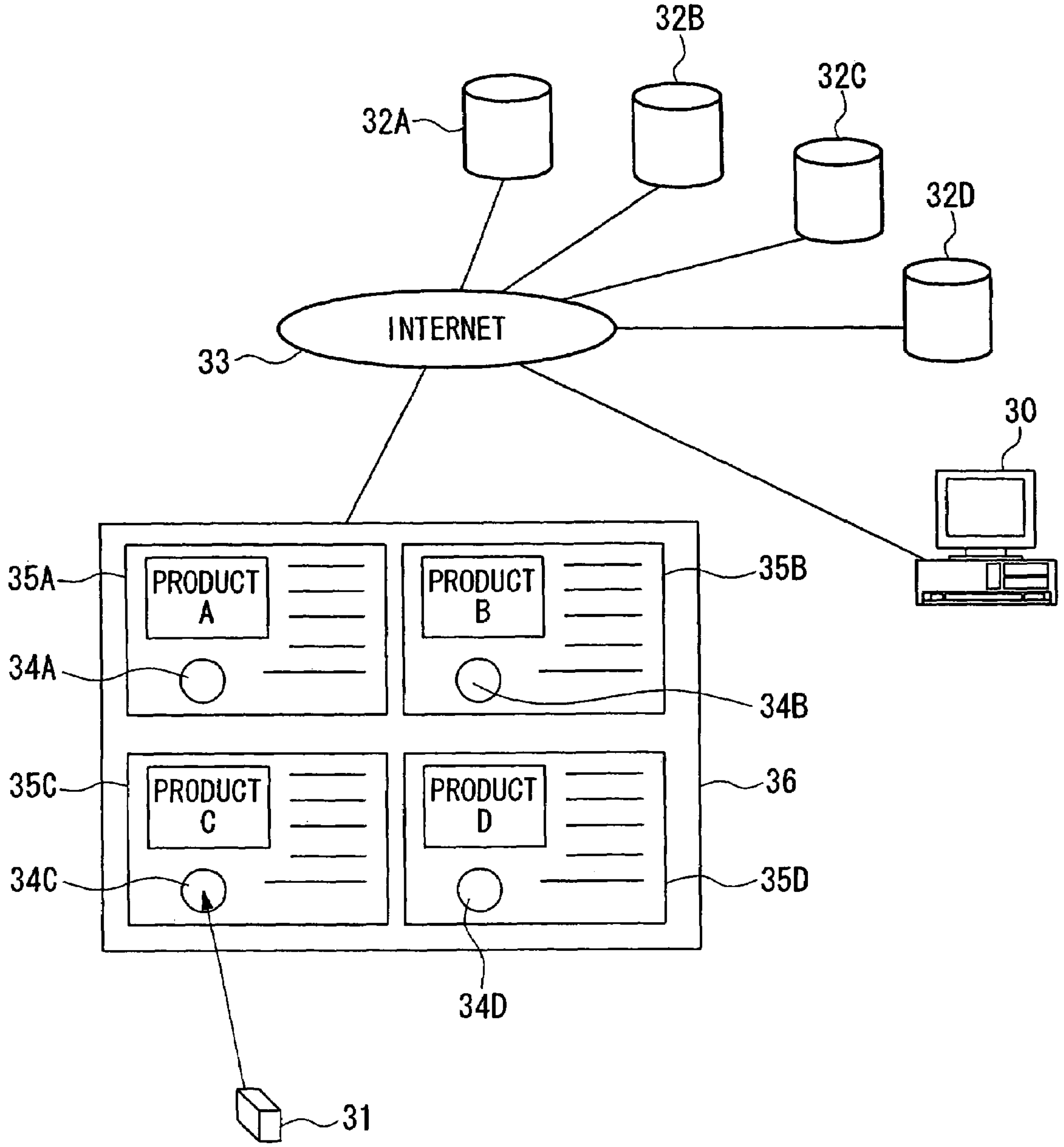
FIG. 5 is a drawing showing the advertising system according to the third embodiment of the first aspect of the present invention.

Third Embodiment According to the First Aspect of the Present Invention FIG. 5 is a drawing showing the third embodiment of the advertising system according to the first aspect of the present invention.

As shown in FIG. 5, the third embodiment of the advertising system according to the first aspect of the present invention comprises a personal computer 30; a wireless device 31 that stores the electronic mail address of this personal computer 30 in an internal memory (not illustrated); product A server 32 A, product B server 32B, product C server 32C, and product D server 32D that handle the products; and an advertising sign 36 that is connected to the Internet 33 and has four sign apparatuses 35A to 35D that transmit to the respective product A server 32A, product B server 32B, product C server 32C, and product D server 32D the request to transmit detailed information (for example, a catalog) about the product to the received electronic mail address when the electronic mail address transmitted from the wireless device 31 is received at the wireless receiving units 34A to 34D.

Figure 6:
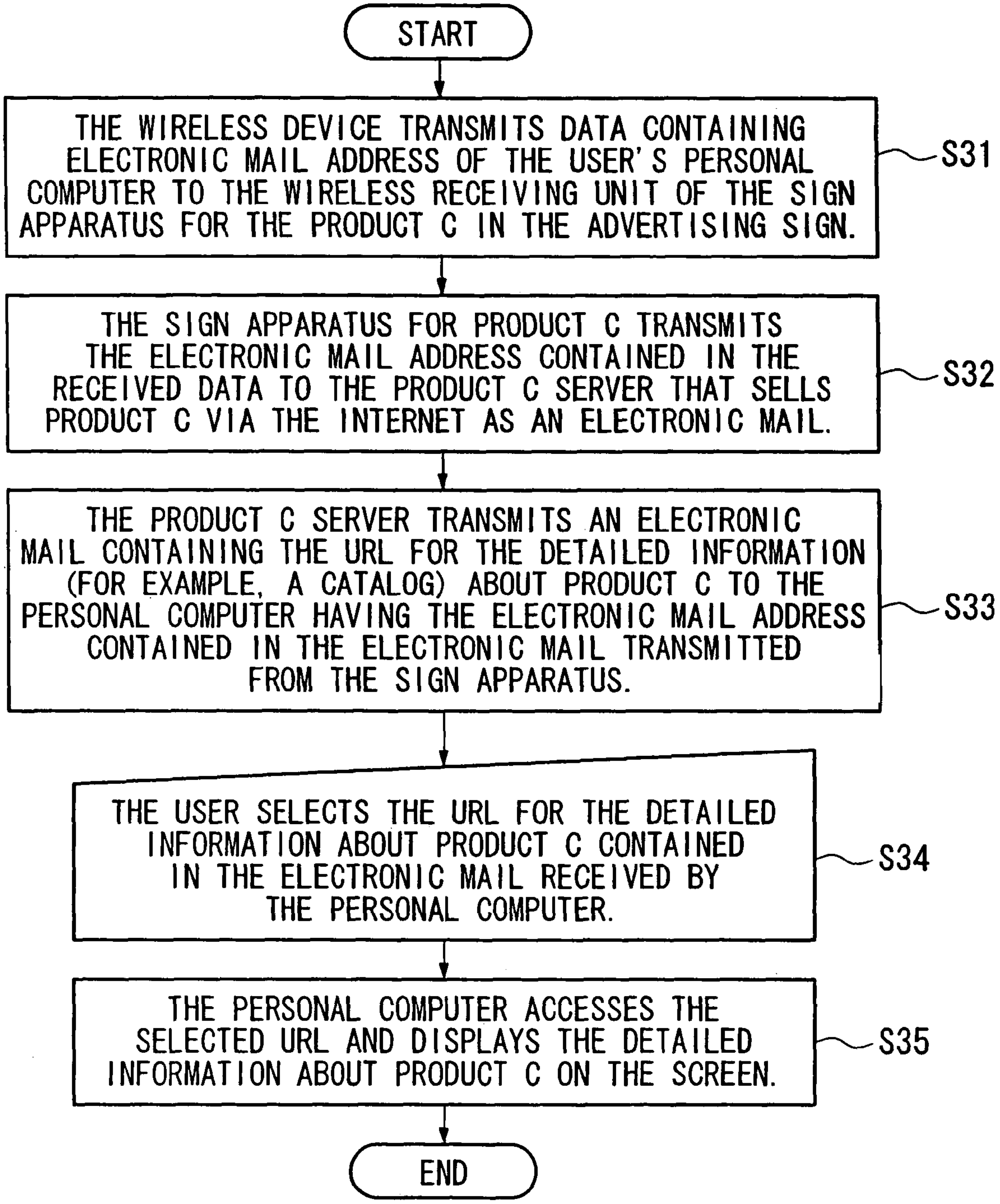
FIG. 6 is a flowchart showing the flow of signals in the advertising system according to the third embodiment of the first aspect of the present invention.

Below, the flow of signals in the third embodiment of the advertising system according to the first aspect of the present invention will be explained with reference to the flowchart in FIG. 6.

In the third embodiment of the advertising system according to the first aspect of the present invention, assume that simple advertisements about to product A, product B, product C, and product D are shown in the advertising sign 36, and a user decides to obtain detailed information about product C after seeing an advertisement about this product.

The user who has decided to obtain the detailed information about product C transmits data containing the electronic mail address of the user's personal computer 30 from the wireless device 31 to the wireless receiving unit 34C of the sign apparatus 35C for product C in the advertising sign 36 (step S 31).

The sign apparatus 35C for the product C that has received the data transmitted from the wireless device 31 transmits the electronic mail address contained in the received data to the product C server 32C that sells product C as an electronic mail via the Internet 33 (step S 32).

The product C server 32C that received the electronic mail transmitted from the sign apparatus 35C for product C transmits an electronic mail containing the URL for the detailed information (for example, a catalog) about product C to the personal computer 30 having the electronic mail address contained in the electronic mail transmitted from the sign apparatus 35C (step S 33).

The user selects the URL for the detailed information about product C contained in the electronic mail received by the personal computer 30 (step S 34).

Next, the personal computer 30 accesses the selected URL and displays the detailed information about product C on the screen (step S 35).

In this manner, the user in the third embodiment of the advertising system according to the first aspect of the present invention can receive an electronic mail in the personal computer 30 at his residence or the like and can obtain detailed information about product C without manually writing on paper or storing in the memory of a mobile telephone the URL in the advertising sign 36 when the user has decided to obtain detailed information about product C after seeing the advertising sign 36.

Embodiments According to the Second Aspect of the Present Invention

Figure 7:
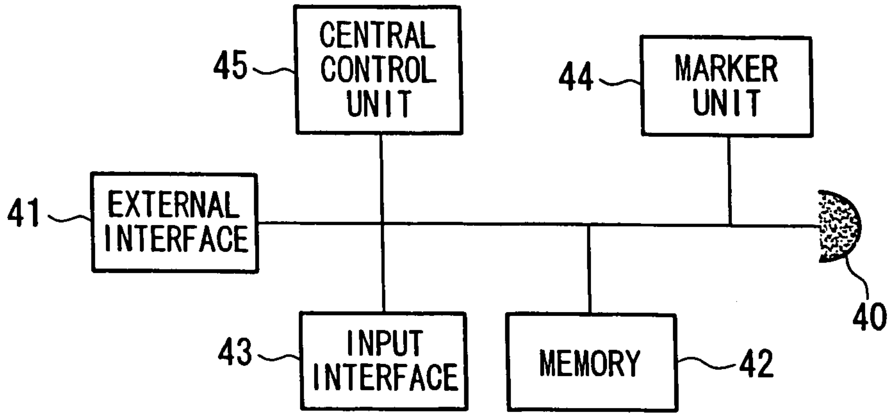
FIG. 7 is a drawing showing the wireless device in the embodiments of the second aspect of the present invention.

The wireless device in the embodiments of the advertising system according to the second aspect of the present invention is shown in FIG. 7.

The wireless device in FIG. 7 is used in the above described the first embodiment, second embodiment, and third embodiment according the first aspect of the present invention, and comprises one wireless transmitting unit 40, an external interface 41 that inputs externally transmitted, a memory 42 that stores the data to be transmitted, an input interface 43 that can select data to be transmitted from the data stored in the memory 42, a marker unit 44 that shows the direction of the transmitted signal, and a central control unit 45 that forwards the data from the memory 42 to the wireless transmitting unit 40.

The data input from the external interface 41 and stored in the memory 42 is selected at the input interface 43. The central control unit 45 that has detected the selection by the input interface 43 forwards the selected data in the memory 42 to the wireless transmitting unit 40, and it is transmitted.

The marker unit 44 has a built-in element (for example, a visible light semiconductor laser or the like) that can emit visible light, the maker unit 44 is disposed coaxially to or adjacent to the wireless transmitting unit 40, and can make visible the direction of the transmitted wave by using a pointer that emits light in the same direction as the transmitted wave. In addition, because it is possible to know whether or not another wireless device is transmitting due to the marker function of the marker unit 44, it is possible to avoid access competition in the wireless transmission to the same sign apparatus visually.

Note that "coaxially or adjacent to" means that the wireless transmitting unit 40 and the marker unit 44 are disposed on the same plane perpendicular to the direction of the transmitted wave, or that the plane on which the wireless transmitting unit 40 is disposed, which is perpendicular to the direction of the transmitted wave, and the plane on which the marker unit 44 is disposed, which is perpendicular to the direction of the transmitted wave are adjacent to each other.

Furthermore, the visible light pointer emitted from the marker unit 44 of the wireless transmitting apparatus is given a fixed form, such as a star shape or an elliptical shape by using a scan mirror or a sheet polarizer. Thus, in the case that a plurality of wireless transmitting apparatuses are transmitting to the same wireless receiving apparatuses (sign apparatuses), the transmission target of one's own wireless transmission apparatus can be easily understood.

If the external interface 41 has, for example, a USB (Universal Serial Bus) architecture, it is possible to input data directly from the personal computer or the like, and if the external interface 41 serves as the interface of a mobile telephone, it is possible to input the data from the mobile telephone.

As data stored in the memory 42, the address of the wireless device, electronic mail addresses, and mobile telephone numbers can be considered.

The Embodiments According to the Third Aspect of the Present Invention

Figure 8:
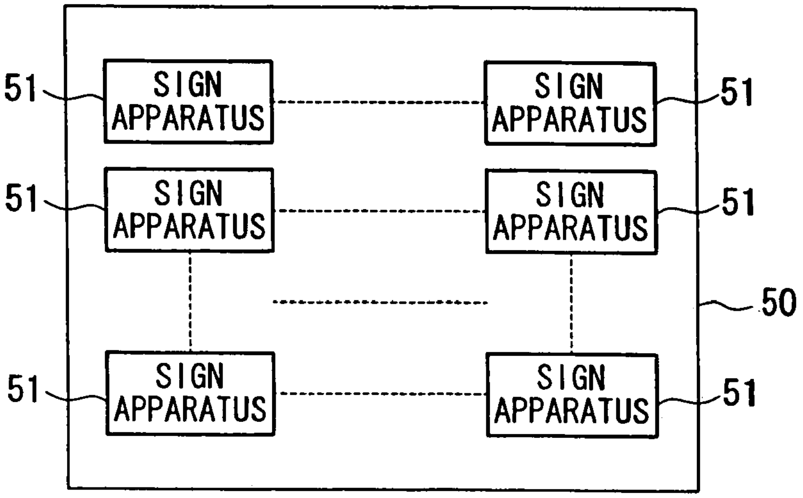
FIG. 8 is a drawing showing the first embodiment of the advertising sign in the third aspect of the present invention.

The embodiments of the advertising sign according to the third aspect of the present invention is shown in FIG. 8.

The advertising sign 50 shown in FIG. 8 is used in the above-described first embodiment, second embodiment, and third embodiment according to the first aspect of the present invention, and comprises a plurality of sign apparatuses 51.

Figure 9:
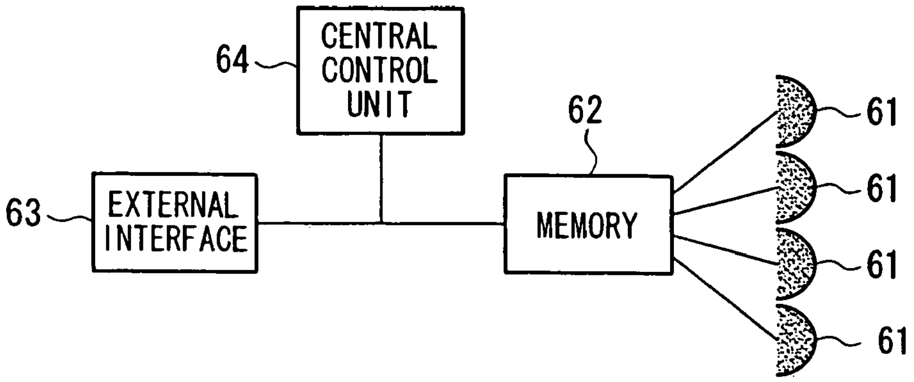
FIG. 9 is a drawing showing the first embodiment of each sign apparatus in an advertising sign in the third aspect of the present invention.

The embodiment of each of the sign apparatuses 51, that is, the embodiment of each of the sign apparatuses 51 in the advertising sign 50 in the third aspect of the present invention, is shown in FIG. 9.

The sign apparatus shown in FIG. 9 comprises one wireless receiving unit 61, a memory 62 that stores data received from the wireless receiving unit 61, an external interface 63 that outputs received data to the external apparatus (not illustrated), and a central control unit 64 that forwards data from the memory 62 to the external interface 63.

The data received by the wireless receiving unit 61 is sent to the memory 62 and stored there. When data is stored in the memory 62, the central control unit 64 forwards this data to the external interface 63, which then outputs the data to the outside.

At the central control unit 64, in order to guarantee the order of the data received from different wireless receiving units 61, buffer control is also carried out in the memory 62. For example, in the case that data is forwarded using a first-in-first-out policy, the memory 62 is structured using a FIFO (first-in-first-out) architecture, and the central control unit 64 controls this FIFO processing.

In the sign apparatus shown in FIG. 9, each of the wireless receiving units 61 is each separately connected to the memory 62, but in the case that the memory 62 has a bus arbiter function, a bus connection architecture can also be considered.

In addition, in the case that there is a system bus arbiter function, an architecture wherein each of the wireless receiving units 61 is connected to the system bus to which the central control unit 64 is connected can also be considered.

Figure 10:
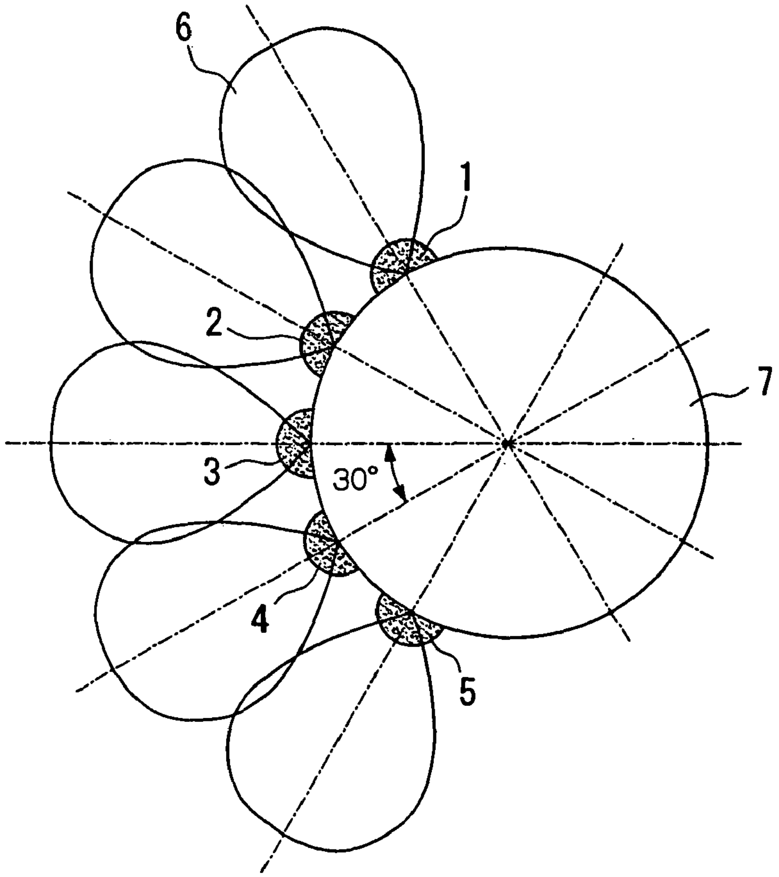
FIG. 10 is a drawing showing an example of the arrangement of the wireless receiving units in each of the sign apparatuses in an advertising sign in the third aspect of the present invention.

An example of the arrangement of the wireless receiving units 61 in the sign apparatuses in FIG. 9 is shown in FIG. 10. In FIG. 10, reference numerals 1 to 5 denote wireless receiving units, reference numeral 6 denotes the directionality pattern of the wireless receiving unit 1, and reference numeral 7 denotes the signal apparatus.

As shown in FIG. 10, in the sign apparatus in FIG. 9, by disposing the wireless receiving units 61 (in FIG. 10, wireless receiving units 1, 2, 3, 4, 5, . . . ) in a circle, it is possible to increase the direction from which one sign apparatus can receive up to maximum of 360 degrees in one plane. For example, if the directionality of one wireless receiving unit is 15 degrees vertically and horizontally, as shown in FIG. 10, it becomes possible to dispose a maximum of 12 wireless receiving units on one plane, and it becomes possible to receive from 12 wireless transmitting units simultaneously.

Figure 11:
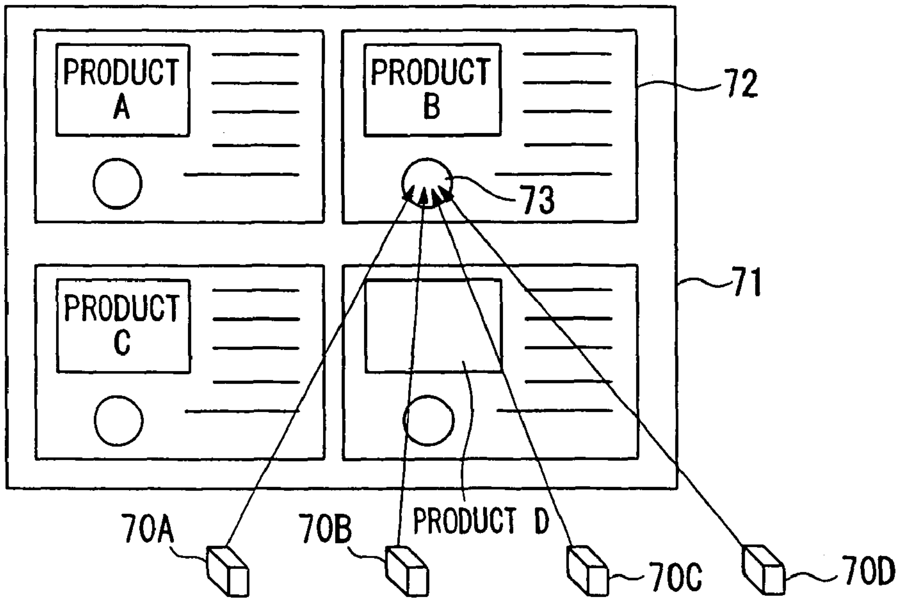
FIG. 11 is a drawing for explaining the effect of the first embodiment of the third aspect of the present invention.

Thus, for example, as shown in FIG. 11, even if the data transmitted from the plurality of wireless devices 70A, 70B, 70C, and 70D arrive at one of the wireless receiving units 73 of the sign apparatuses 72 that forms the advertising sign 71, there will be no interference between the signals from this plurality of data.

Figure 21:
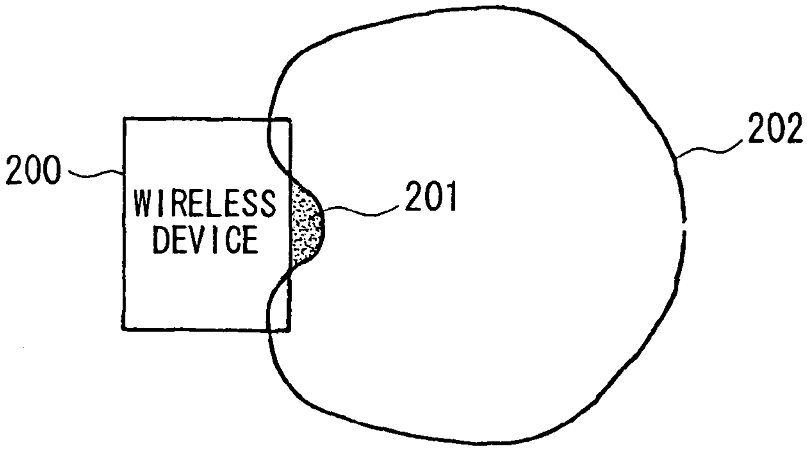
FIG. 21 is a drawing showing the reception directionality of the conventional wireless devices that assume one-to-one communication over a single channel.

In this manner, as shown in FIG. 21, in a conventional wireless device the necessary communication space is covered by a single wireless receiving unit 201 having a wide directionality. In contrast, in FIG. 10, the desired communication space (at the maximum: 360 degrees) is covered by using one or more wireless receiving units having a narrower directionality than the conventional wireless device. In addition, in the case that the desired communication space is covered by using two or more wireless receiving units, these wireless receiving units are arranged so that to the extent possible their directionality patterns do not overlap.

Therefore, according to the embodiments of the advertising sign of the third aspect of the present invention, it is possible to receive data transmitted simultaneously from each of the transmitting apparatuses of a plurality of users without using a multiple access format.

Thus, according to the embodiments of the advertising sign of the third aspect of the present invention, products and services can be advertised effectively at the locations where users gather, such as shopping areas, buildings, train stations, or inside trains.

In addition, if a hood for blocking light such as sunlight is attached to the wireless receiving units 61 in the sign apparatus in FIG. 9, it is possible to improve the reception sensitivity when using, for example, infrared light for electromagnetic transmission, and the effect of extending the distance reached by the infrared light can also be expected.

Figure 12:
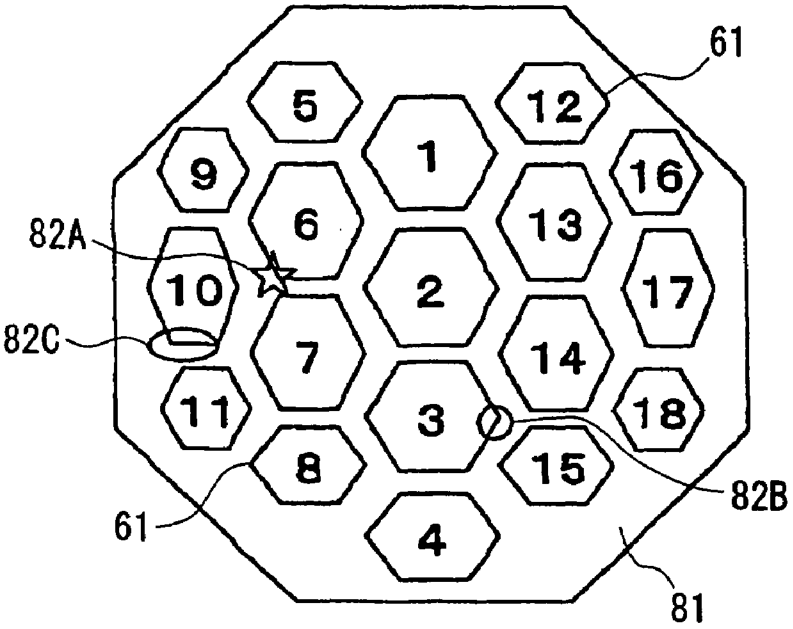
FIG. 12 is a drawing showing the appearance of the gap shown by white paint or retro-reflectors between each of the wireless receiving units in the sign apparatus in the advertising sign in the third aspect of the present invention.

In addition, in the advertising sign 50 in FIG. 8 and the sign apparatuses in FIG. 9, the gap between the sign apparatuses 51 and the wireless receiving units 61 is shown using white paint or retro-reflectors, and thereby the position of the visible light emitted from the marker unit 44 of the wireless device in FIG. 7 can be easily understood. In this manner, an example of the advertising sign in FIG. 9 having the gap between the wireless receiving units 61 shown by white paint or retro-reflectors 81 is shown in FIG. 12. Note that in FIG. 12, reference numbers 82A to 82C are pointers.

Figure 13:
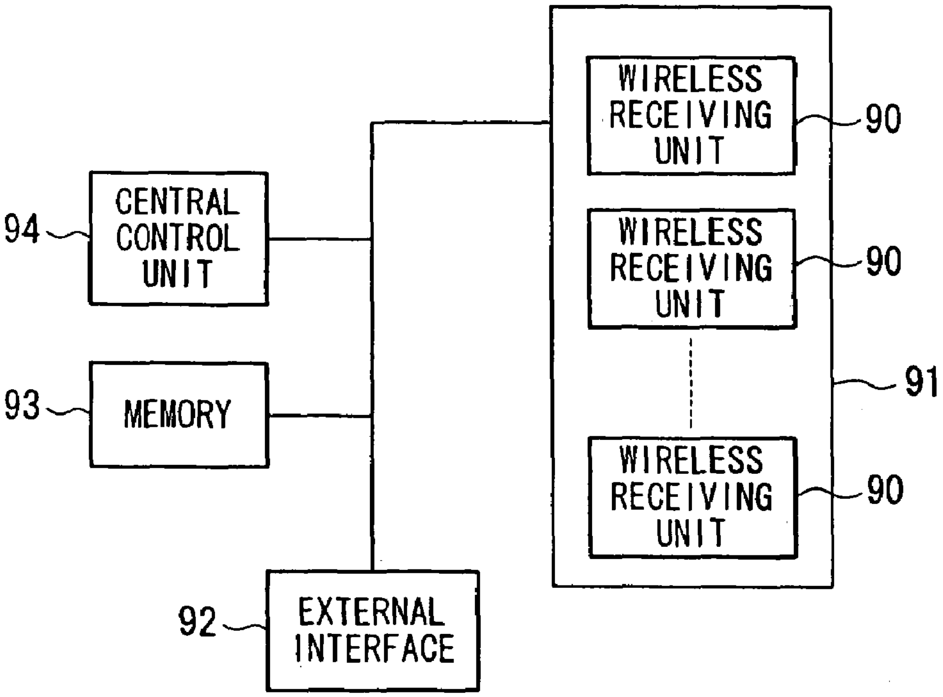
FIG. 13 is a drawing showing the second embodiment of the third aspect of the advertising sign of the present invention.

Moreover, the structure of the advertising sign according to the third aspect of the present invention is not limited by FIG. 8 and FIG. 9. As shown in FIG. 13, the processing carried out by the central control unit, memory, and external interface of each of the sign apparatuses can be respectively carried out by one central control unit, one memory, and one external interface, and this one central control unit, one memory, and one external interface can be provided outside the sign apparatus in FIG. 9.

Specifically, FIG. 13 is a drawing showing the second embodiment of the advertising sign according to the third aspect of the present invention, and the advertising sign shown in FIG. 13 comprises one or more sign apparatuses 91 that have one or more wireless receiving units 90, an external interface 92 that can connect to a public network or the Internet, a memory 93 that can overwrite the data using the external interface 92, and a central control unit 94 that can decode the received data.

The central control unit 94 selects the data from the memory 93 based on the data that the wireless receiving unit 90 has received, and transmits the data to the external interface 92. The central control unit 94 carries the necessary protocols for connecting to the external interface 92. For example, in the case that IEEE 802.3 is used as the external interface to establish a connection with the Internet, the central control unit 94 carries the TCP/IP (Transmission Control Protocol/Internet Protocol) Internet protocols.

When the wireless receiving unit 90 receives the data, this received data is written into the memory 93, and the central control unit 94 is notified about this reception. The central control unit 94 assembles the data that is to be transmitted from the memory 93 to the external interface 92 based on the received data in the memory 93, and transmits the data to the external interface 92.

The Embodiments According to the Fourth Aspect of the Present Invention

Figure 14:
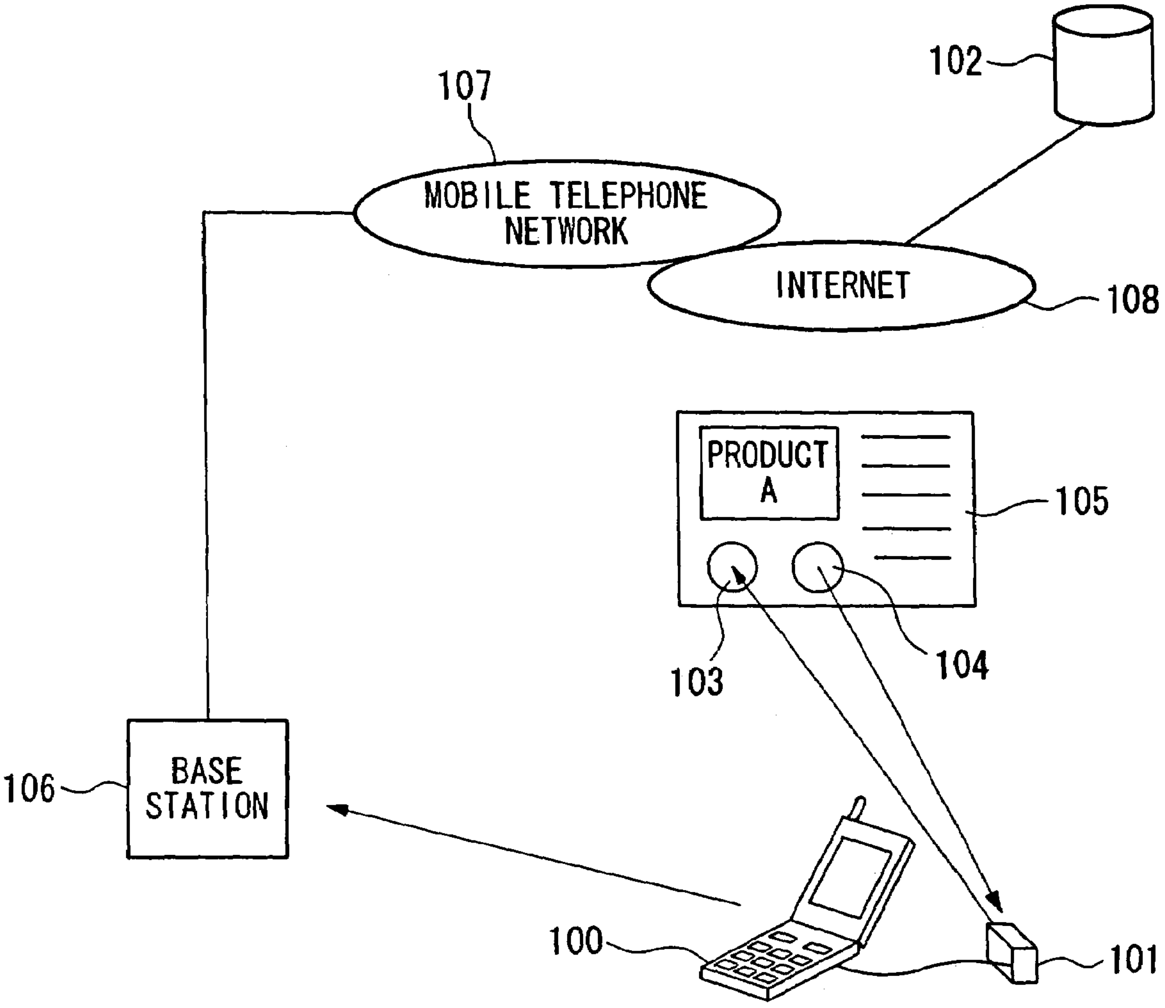
FIG. 14 is a drawing showing the embodiments of the advertising system according to the fourth aspect of the present invention.

The embodiments of the advertising system according to the fourth aspect of the present invention is shown in FIG. 14.

As show in FIG. 14, the embodiments of the advertising system according to the fourth aspect of the present invention comprises a mobile telephone 100; a wireless device 101 that is connected to the mobile telephone 100 and stores the electronic mail address of this mobile telephone 100 in an internal memory (not illustrated); product A server 102 that handles product A; and an advertising sign 105 that has one sign apparatus that stores the address (URL) of the product A server 102 and that transmits the address (URL)

of the product A server 102 that stores the received electronic mail address from the wireless transmitting unit 104 when an electronic mail address transmitted from the wireless device 101 is received by the wireless receiving unit 103.

The number of the mobile telephone, the serial number of the wireless device or the like can substitute for the electronic mail address stored in the internal memory of the wireless device 101.

Figure 15:
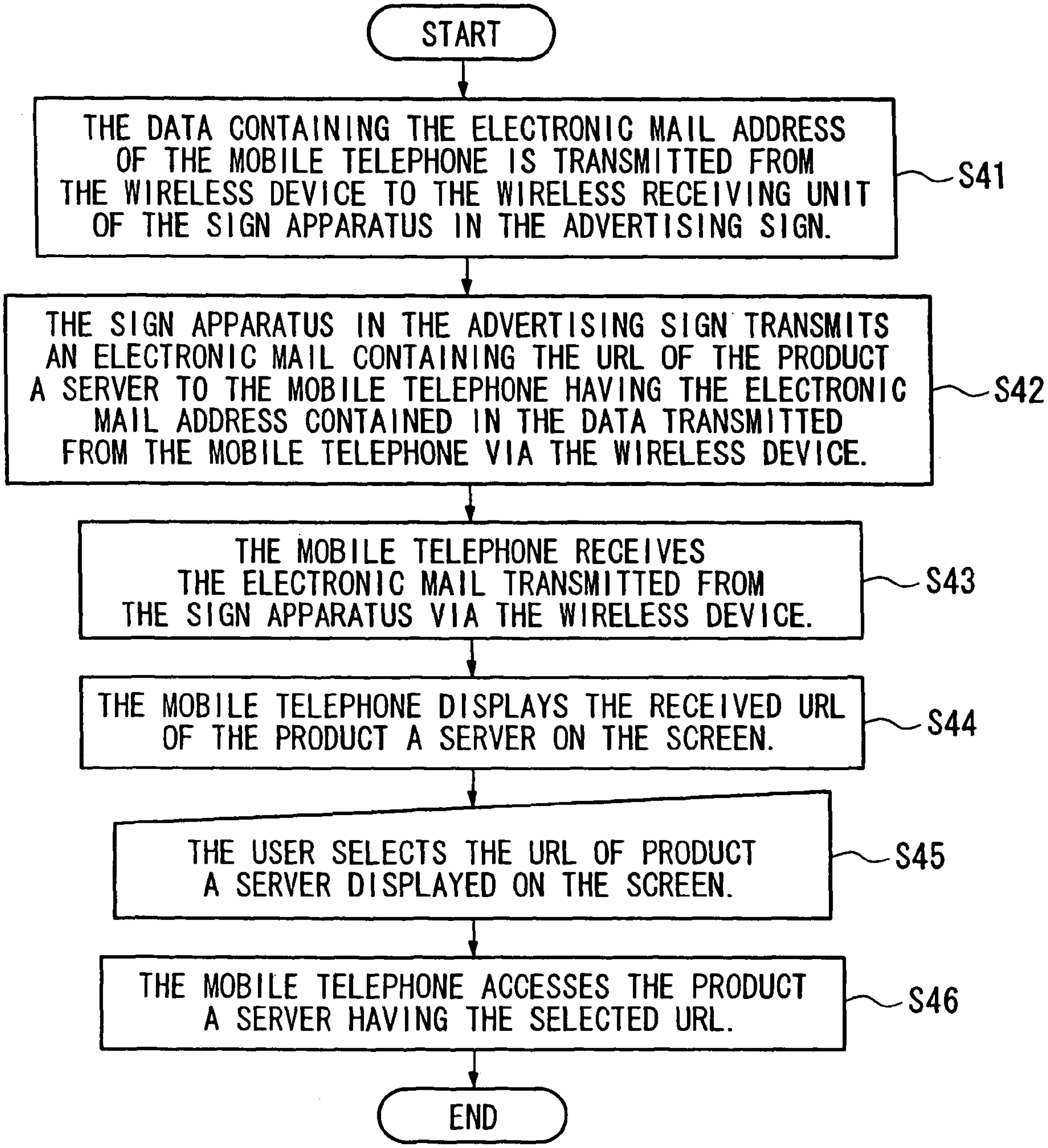
FIG. 15 is a flowchart showing the flow of signals in the advertising system in the embodiments of the fourth aspect of the present invention.

Below, the flow of the signals in the embodiments of the advertising system according to the fourth aspect of the present invention will be explained with reference to the flowchart in FIG. 15.

The user who has decided to purchase the product A after seeing the advertising sign 105 transmits data that contains the electronic mail address of the mobile telephone 100 from the wireless device 101 to the wireless receiving unit 103 of the sign apparatus in the advertising sign 105 (step S 41).

The sign apparatus that has received the data transmitted from the wireless device 101 transmits an electronic mail containing the URL of the product A server 102 to the mobile telephone 100 having the electronic mail address contained in the data transmitted from the mobile telephone 100 via the wireless device 101 (step S 42).

Moreover, the format of the information containing the URL of the product A server 102 transmitted from the sign apparatus is not limited to electronic mail. For example, another data format consisting of only the character string for the URL of the product A server 102 can also be used.

The mobile telephone 100 receives the electronic mail transmitted from the sign apparatus via the wireless device 101 (step S 43). In step S 43, the wireless device 101 determines whether or not the electronic mail address of the electronic mail transmitted from the sign apparatus is the electronic mail address stored in its own memory, confirms that the electronic mail is one that is addressed to the apparatus itself, and after the confirmation thereof, transmits the URL contained in the received electronic mail to the mobile telephone 100 via the external interface (not illustrated).

The mobile telephone 100 to which the URL has been transmitted from the wireless device 101 via the external interface displays the received URL on the screen.

Therefore, the user selects the URL of the product A server 102 displayed on the screen (step S 44) and accesses the product A server 102 having this URL from the mobile telephone 100 via the base station 106, the mobile telephone network 107, and the Internet 108 (step S 45), and thereby the user can access the product A server 102 that handles product A (step S 46) without inputting the URL into the mobile telephone 100 manually.

Moreover, in the embodiments according to the fourth aspect of the present invention, the ordering telephone number of the product A can serve as the URL that the sign apparatus transmits, and in this case, the user can telephone the ordering site for product A without manually inputting the telephone number by telephoning the telephone number transmitted from the sign apparatus.

The Embodiments According to the Fifth Aspect of the Present Invention

Figure 16:
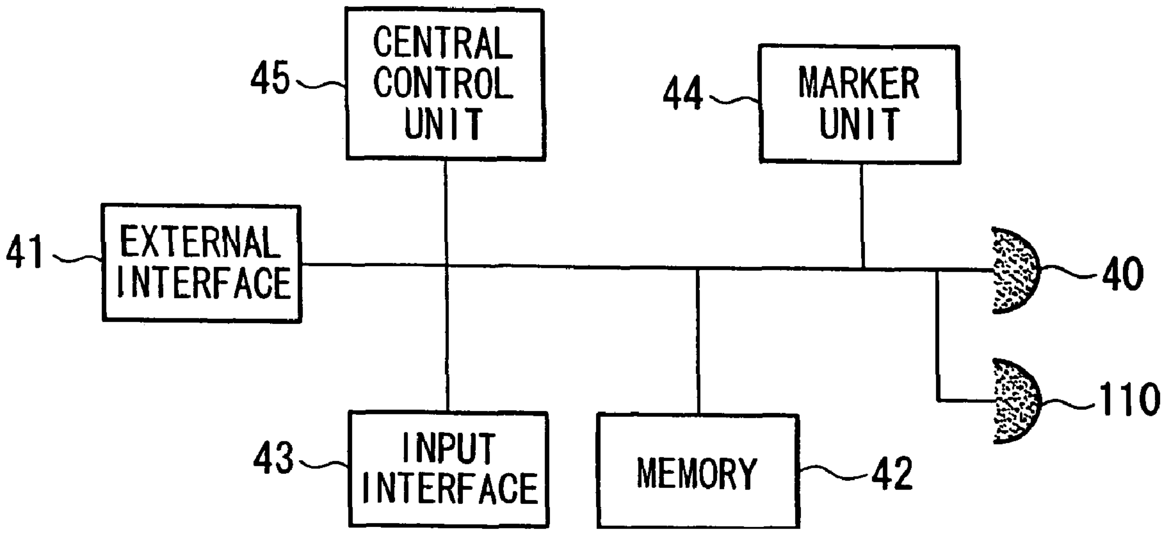
FIG. 16 is a drawing showing the wireless device in the embodiments of the fifth aspect of the present invention.

The wireless device in the embodiments of the advertising system according to the fifth aspect of the present invention is shown in FIG. 16.

The wireless device in FIG. 16 is formed by adding a wireless receiving unit 110 to the wireless apparatus shown in FIG. 7, and the signal received from this wireless receiving unit 110 is decoded by the central control unit 45 and output to the external devices via the external interface 41.

Generally, the information request signal is formed only by an ID (IDentifier), and the information signal is formed by a long character string such as a URL. Therefore, the amount of information in the information request signal and the information signal is very different. Thus, a low speed circuit is adequate for the transmission and reception of the information request signal, while a high speed circuit is necessary for the transmission and reception of the information signal.

In the embodiments according to the fifth aspect of the present invention, the transmitting unit and the receiving unit are independent in the wireless device, and thereby each of the wireless transmitting units 40 and each of the wireless receiving units 110 can use respectively differing speeds and differing media. Therefore, in the embodiments according to the fifth aspect of the present invention, the wireless receiving units 110 are equipped with a low speed apparatus and the wireless transmitting units 40 are equipped with a high speed apparatus. Thus, in the embodiments according to the fifth aspect of the present invention, the cost of the apparatus as a whole can be reduced.

In addition, in the case that identical communication distances are to be implemented, the drive power of the high speed apparatus is generally larger than that of the low speed apparatus. As described above, in the embodiments according to the fifth aspect of the present invention, it is possible to form a wireless transmitting unit 40 using a high speed apparatus while it is possible to form a wireless receiving unit 110 using a low speed apparatus. Therefore, in the embodiments according to the fifth aspect of the present invention, it is possible to reduce both the cost of the apparatus on the advertising side and the drive power during standby. Furthermore, in the embodiments according to the fifth aspect of the present invention, by using batteries or the like as a drive power source, it is possible to extend the drive time thereof, and reduction of maintenance costs can be realized.

The Embodiments According to the Sixth Aspect of the Present Invention

Figure 17:
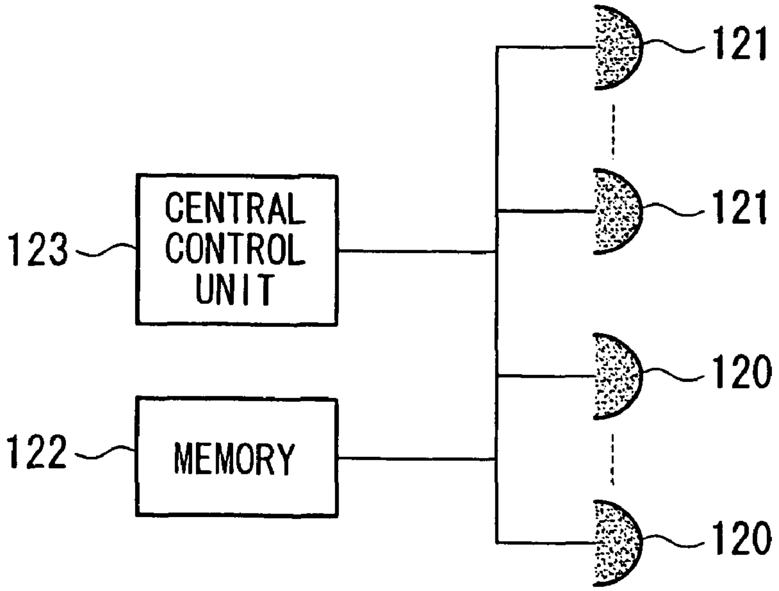
FIG. 17 is a drawing showing the embodiments of each of the sign apparatuses in an advertising sign according to the sixth aspect of the present invention.

The embodiment of each sign apparatus in the advertising sign in the sixth aspect of the present invention is shown in FIG. 17.

The advertising sign shown in FIG. 17 comprises one or more wireless receiving units 120, one or more wireless transmitting units 121, a memory 122 that stores data transmitted from the wireless transmitting units 121, and a central control unit 123 that decodes the received data and controls the wireless receiving units 120 and the wireless transmitting units 121. The central control unit 123 selects data from the memory 122 based on the data received by the wireless receiving units 120, and transmits the data to the wireless transmitting units 121.

In addition, the central control unit 123 is equipped with a function that periodically transmits the transmitted data in the memory 122 in the case that there is only one unit of transmitted data.

In the embodiments according to the sixth aspect of the present invention, one or more wireless receiving units 120 can be disposed as shown in FIG. 10. In addition, in the embodiments according to the sixth aspect of the present invention, the disposition of one or more wireless transmitting units 121 can be arranged identically to the disposition of the wireless receiving units shown in FIG. 10. In addition, in the embodiments according to the sixth aspect of the present invention, the directionalities can be made similar spaces by disposing one wireless receiving unit 120 and one wireless transmitting unit 121 adjacently, and if the space is partitioned, a plurality of terminals can communicate without interference.

Figure 18:
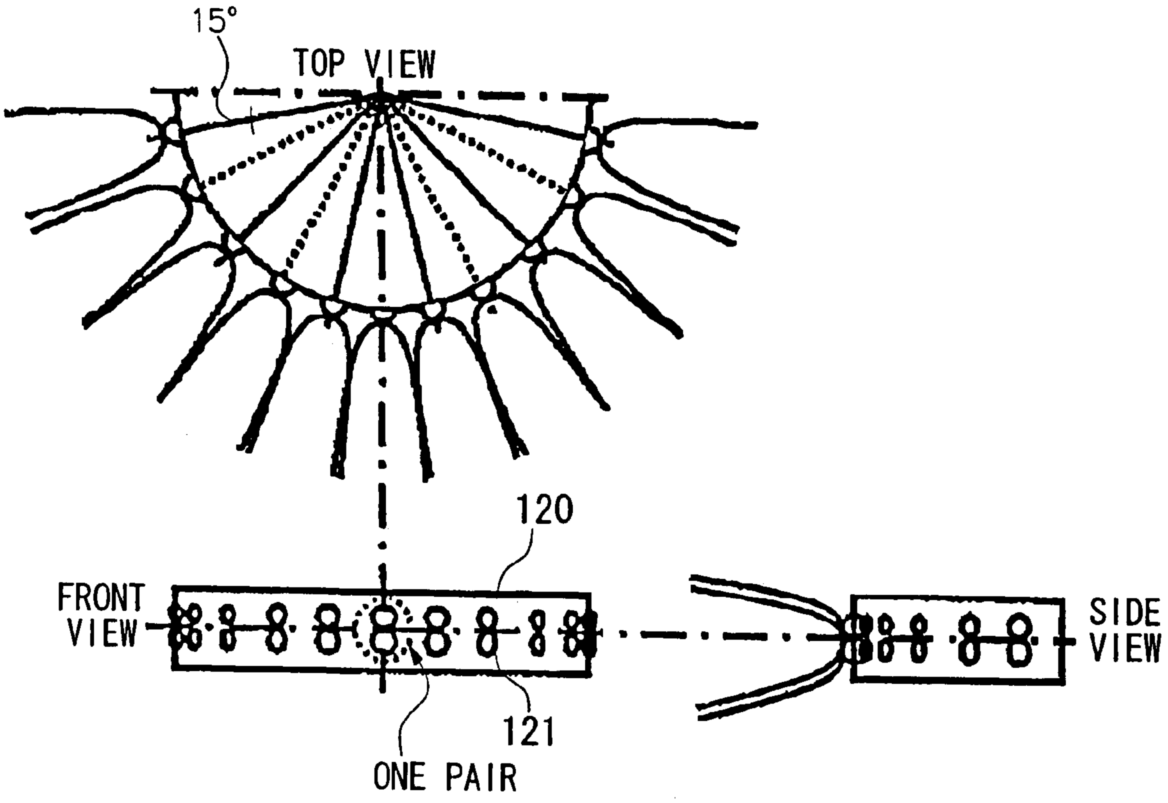
FIG. 18 is a drawing showing an example of the arrangement of the embodiments of the wireless transmitting and receiving units according to the sixth aspect of the present invention.

An example of the disposition of the wireless receiving units and the wireless transmitting units in the embodiments according to the sixth aspect of the present invention is shown in FIG. 18.

In FIG. 18, the wireless receiving units 120 and the wireless transmitting units 121 are disposed vertically to form a pair of bi-directional communicating units, the directionality of the wireless receiving units 120 and the wireless transmitting units 121 is aligned, and a bi-directional communication space is created. The wireless receiving units 120 and the wireless transmitting units 121 are arranged in two dimensions in the example in FIG. 18, but as shown in FIG. 12, it also possible to mange them in three dimensions. In this case, the communication space can also be partitioned in a vertical space as well.

The Embodiments According to the Seventh Aspect of the Present Invention

Figure 19:
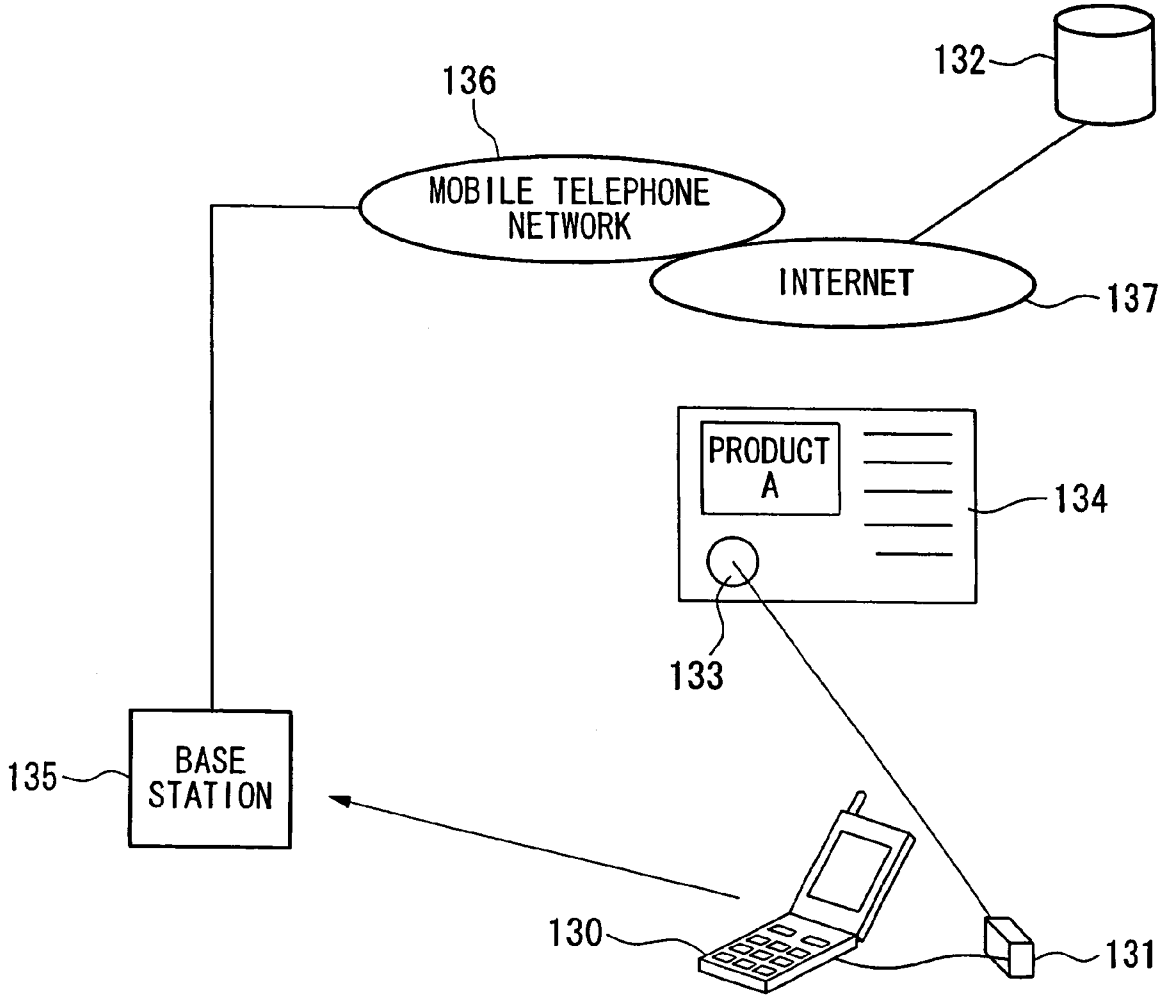
FIG. 19 is a drawing showing the embodiments of the advertising system according to the seventh aspect of the present invention.

The embodiments of the advertising system according to the seventh aspect of the present invention is shown in FIG. 19.

As shown in FIG. 19, the embodiments of the advertising system according to the seventh aspect of the present invention comprises a mobile telephone 130, a wireless device 131 that is connected to this mobile telephone 130 by an external interface (not illustrated), a product A server 132 that handles product A, and an advertising sign 134 has one sign apparatus that stores the address (URL) of the product A server 132 and that autonomously and periodically transmits the address (URL) of this product A server 132 from a wireless transmitting unit 133.

Figure 20:
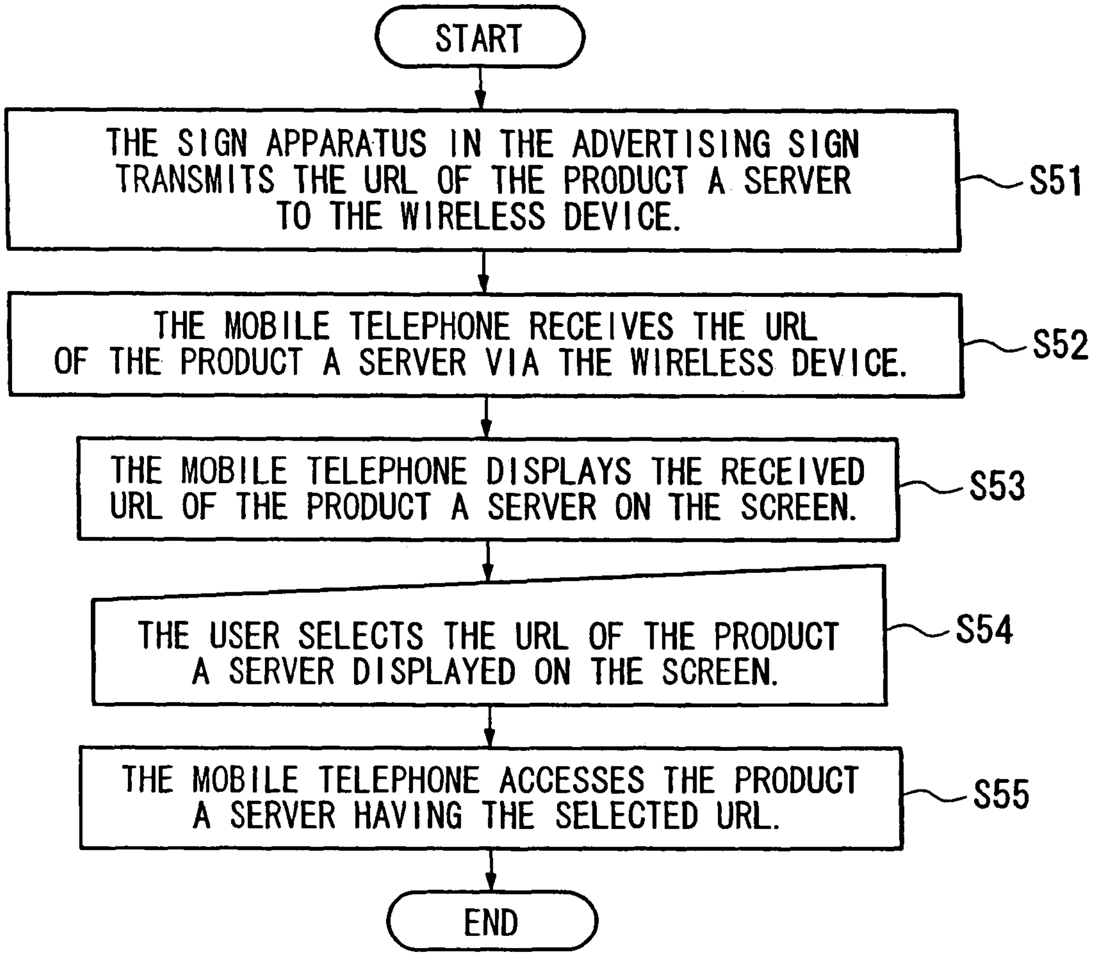
FIG. 20 is a flowchart showing the flow of signals in the embodiments of the advertising system according to the seventh aspect of the present invention.

Below, the flow of signals in the embodiments of the advertising system according to the seventh aspect of the present invention will be explained with reference to the flowchart in FIG. 20.

First, the sign apparatus in the advertising sign 134 autonomously and periodically transmits the URL of the product A server 132 to the wireless device 131 (step S 51).

The wireless device 131 that has received the data from the advertising sign 134 transmits the URL in the received data to the mobile telephone 130 via the external interface (step S 52).

At the mobile telephone 130, the URL received via the external interface from the wireless device 131 is displayed on the screen (step S 53).

Next, the user selects the URL displayed on the screen (step S 54) to access the product A server 132 having this URL via the base station 135, the mobile telephone network 136, and the Internet 137 (step S 55).

Therefore, according to the embodiments of the advertising system of the seventh aspect of the present invention, the product A server 132 that handles product A can be accessed without manually inputting the URL into the mobile telephone 130.

In addition, according to the embodiments of the advertising system of the seventh aspect of the present invention, it is not necessary to provide a wireless transmitting unit 131 in the wireless device 131, and it is not necessary to provide a wireless receiving unit in the sign apparatus of the advertising sign 134. Therefore, according to the embodiments of the advertising system of the seventh aspect of the present invention, it is possible to implement a low cost standard for the wireless device and the sign apparatus. Moreover, because a wireless transmitting unit is not provided in the wireless device 131, in the present embodiments, the marker unit 44 can show the direction of the received signals.

Moreover, the advertising sign according to each of the embodiments of the present invention described above show advertisements related to products, but the advertising sign according to the present invention is not limited thereby. Therefore, the advertising sign according to the present invention is not limited to advertisements related to products, but advertisements related to services can also be shown.

In addition, in the embodiments described above, the terminal of the mobile telephone and the like and the wireless device are separate, but the functions of the wireless device can be incorporated into the mobile telephone.

What is claimed is:

1. An advertising system comprising:

an advertising sign having one or more sign apparatuses that receive a terminal address indicating an address of a terminal which is transmitted from a wireless device; and an advertising server that transmits advertising data to the terminal, wherein each of the sign apparatuses comprises:

a plurality of wireless receiving units, each having a narrow directionality, that cover reception of a signal in a desired communication space by arranging the wireless receiving units so that patterns of the directionality of the respective wireless receiving units do not overlap, and respectively receive terminal addresses respectively transmitted from a plurality of wireless devices as electromagnetic waves, including electrical waves and light, or sound waves, including ultrasonic waves;

a memory that stores the terminal addresses respectively received by the wireless receiving units;

a central control unit that reads one of the terminal addresses stored by the memory; and an external interface that inputs the terminal address read by the central control unit and transmits the input terminal address to the advertising server via a public network or the Internet, and the advertising server receives the terminal address transmitted from each of the sign apparatuses and transmits the advertising data to the terminal having the address indicated by the received terminal address.

2. An advertising system according to claim 1, wherein the terminal is a mobile telephone, a personal computer, or a mobile information terminal.

* * * * *